United States Patent Office 3,573,258
Patented Mar. 30, 1971

3,573,258
PROCESS FOR PRODUCING PIVALOLACTONE-TRIOXANE COPOLYMERS
Derek L. Ransley, Berkeley, Calif., assignor to Chevron Research Company, San Francisco, Calif.
No Drawing. Filed Oct. 22, 1969, Ser. No. 868,642
Int. Cl. C08g 1/12, 3/00
U.S. Cl. 260—64       5 Claims

ABSTRACT OF THE DISCLOSURE

Pivalolactone-trioxane copolymers and process for their manufacture by reacting the lactone with trioxane in a molar ratio of from 3:2 to 24:1 in the presence of a strong base.

BACKGROUND OF THE INVENTION

Field of the invention

This invention relates to novel copolymers of pivalolactone and trioxanes which contain major molar amounts of units derived from pivalolactone and a process for producing these poymers by the condensation of the monomer units in the presence of a strong base.

Description of the prior art

Homopolymers of pivalolactone are known and have been produced; but since they have a melting temperature of about 237° C. and a decomposition temperature only slightly above 300° C., considerable difficulty has been experienced in effecting simple thermal molding of the materials.

Minor amounts of pivalolactone have been combined with trioxane monomer units to produce polymers which have primarily an oxymethylene structure. These materials, which are not essentially different from trioxane homopolymers, are relatively low melting (175° C.) and are produced by the reaction of pivalolactone and trioxane in the presence of a Lewis acid catalyst, such as $BF_3$, $FeCl_3$ or the coordination complexes of $BF_3$ with organic compounds in which the donor atom is oxygen or sulfur. British Patent 981,008 describes these polymers which contain oxymethylenic sequences randomly distributed in a ratio of from about 6:1 to about 1000:1 relative to the four carbon carbonylic group derived from pivalolactone.

SUMMARY OF THE INVENTION

Improved copolymers of pivalolactone and trioxane are provided which comprise randomly dispersed oxymethylene units and carbonylic units of the formula

derived from pivalolactone. The polymers are produced by the reaction of a mixture of pivalolactone and trioxane, the mixture containing a major molar amount of pivalolactone, in the presence of a strong alkali metal base.

The base catalysts suitable for this reaction of trioxane and pivalolactone are the strong alakli metal bases. Such catalysts include the anhydrous hydroxides, such as sodium hydroxide and potassium hydroxide; the alkoxides, such as sodium methoxide, lithium ethoxide, and potassium tertiary butoxide; the hydrides such as sodium hydride, and lithium aluminum hydride; the metal alkyls and aryls, such as butyl lithium and phenyl sodium; and the metal amides, such as sodium amide and potassium amide.

These strong, alkali metal base catalysts are the alkali metal salts of very weak acids. Such acids have pKa values greater than 13, preferably greater than 20, as measured at 25° C. in anhydrous solvents such as diethylether, etc.

In effecting the polymerization, a mol ratio of pivalolactone to trioxane of some 3:2 to 24:1 is employed. A preferred range of ratios is from 12:1 to 24:1. When more than about 40 mol percent of the polymer constitutes oxymethylene groups from trioxane, the polymer is crumbly and unsuitable for any structural purpose.

The polymerization is effected by contacting the pivalolactone and trioxane in appropriate ratios in a vessel with air excluded in the presence of a small amount of the base catalyst. From about 0.001 to 0.1 percent by weight based on total charge of the base catalyst is generally effective to promote polymerization. It is preferred that the materials be agitated in order to effect proper contact between the monomer units and catalyst.

The reaction is suitably carried out at a temperature from about 0 to 250° C. It is preferred that the reaction be effected by rapidly heating the reactant mixture to a temperature of from about 150° to 225° C. in order to prevent loss of the lactone from the mixture.

The time required for a reaction of the materials will generally be from about 10 minutes to 10 hours depending upon the conditions of temperature and pressure which are adopted. The pressure at which the materials are reacted may vary from atmospheric pressure up to 100 atmospheres. It is preferred to operate at substantially atmospheric pressure under an inert atmosphere such as nitrogen. Anhydrous conditions are preferred.

The following examples illustrate the processes and compositions of this invention. The examples are intended to be only illustrative and nonlimiting.

EXAMPLE 1

Preparation of pivalolactone-trioxane copolymer

Into a large test tube, which had been washed, thoroughly rinsed with distilled water and dried, were placed 40 g. of distilled pivalolactone, 5 g. of trioxane (0.056 mol) and about 0.001 g. of sodium hydride. The tube was swirled to dissolve the trioxane. It then was heated under a nitrogen atmosphere, the temperature being increased to 220° C. over a period of 70 minutes, at which time the contents of the tube were almost all solid. The tube was then cooled and broken; the contents of the tube, a white solid, was removed, broken and ground. The last traces of monomer from the reaction product were removed by triturating in water, then drying in a vacuum oven. Thirty-nine grams of polymer were obtained. The polymer had a reduced specific viscosity $[\eta_{sp/c}]$ of 3.26 measured at a concentrtion of 0.1% by weight in a 50/50 phenol-tetrachloroethane solution.

EXAMPLE 2

The procedure of Example 1 was followed employing 13.6 g. (0.154 mol) of pivalolactone and 1.7 g. (0.01 mol) of trioxane. The material was heated to 115° C. for a period of two hours. The product was 13.3 g. of a polymer having a reduced specific viscosity of 1.33 measured at 0.3% concentration and a melting point of 232° C. This product was a white, tough, flexible polymer.

The following table sets forth data from additional preparations of copolymers following the general procedure of Example 1:

TABLE I

| Example No. | Trioxane charged, mol percent | Reduced specific viscosity [1] | | Polymer appearance |
|---|---|---|---|---|
| | | Concentration, wt. percent | Viscosity | |
| 3 | 4.2 | 0.3 | 1.39 | Opaque, off white. |
| 4 | 44.0 | 0.5 | 1.27 | Crumbly, white. |
| 5 | 9.4 | 0.5 | 0.82 | |
| 6 | 16.8 | 0.4 | 1.2 | |
| 7 | 9.4 | 0.1 | 3.4 | |

[1] Measured in 50/50 phenol/tetrachloroethane solution at the concentration specified.

A thermogravimetric analysis was carried out on the product of Example 1. In this analysis a sample of the test material on a balance is heated up at a constant rate of 10° C. per minute under a stream of helium flowing at 20 cc./min. The weight of the sample and the temperature are measured continuously. In this way, three temperature points are found; i.e., (1) the temperature at which the sample begins to lose weight, (2) the temperature at which the sample has lost 50% of its weight, and (3) the temperature at which the sample has completely disappeared.

Similar analyses were also carried out on polyformaldehyde and polypivalolactone. Surprisingly, the copolymers of the present invention were more thermally stable than either of the homopolymers of its constituent monomers. These results are given in Table II.

TABLE II.—THERMAL STABILITY COMPARISONS

| Test sample | Temperature, ° C. of— | | |
|---|---|---|---|
| | Initial weight loss | 50% weight loss | 100% weight loss |
| Copolymer of Example 1 | ~340 | 400 | 465 |
| Commercial polyformaldehyde | ~290 | 355 | 390 |
| Polypivalolactone [1] | ~320 | 370 | 390 |

[1] Intrinsic viscosity of 4.13 measured on an 0.1% concentration in a 50/50 phenol/tetrachloroethane solution at 25° C.

The polymers of this invention are tough materials capable of being thermally molded into many useful articles of commerce such as bike handles, toys, etc. The polymers have melting points in the range of 200 to 235° C., molecular weights in the range of 50,000 to 500,000, and decomposition temperatures in excess of 300° C., usually in excess of 320° C.

I claim:

1. A process for producing a copolymer comprising randomly dispersed oxymethylenic units and carbonylic units of the formula

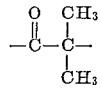

by reacting at a temperature of from 0 to 250° C. pivalolactone and trioxane in a molar ratio of pivalolactone to trioxane of 3:2 to 24:1, the reaction being carried out in the presence of a catalytic amount of a strong, alkali metal, base.

2. The process of claim 1 in which the molar ratio of pivalolactone to trioxane is from 12:1 to 24:1.

3. The process of claim 1 in which the base is present in the amount of 0.001 to 0.1% by weight.

4. The process of claim 3 in which the base is sodium hydride.

5. The process of claim 3 in which the base is sodium methoxide.

References Cited

UNITED STATES PATENTS 3,351,613   11/1967   Natta et al. _____ 260—64
3,422,069   1/1969   Natta et al. _____ 260—64

WILLIAM H. SHORT, Primary Examiner

L. M. PHYNES, Assistant Examiner

U.S. Cl. X.R.

260—67